US012617930B2

(12) United States Patent
Sunaga et al.

(10) Patent No.: US 12,617,930 B2
(45) Date of Patent: May 5, 2026

(54) RESIN COMPOSITION, MOLDED BODY USING SAME AND METHOD FOR PRODUCING RESIN COMPOSITION

(71) Applicant: KURARAY CO., LTD., Kurashiki (JP)

(72) Inventors: Shuichi Sunaga, Kurashiki (JP); Yuta Matsushita, Kurashiki (JP); Wenjie Lu, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 266 days.

(21) Appl. No.: 18/559,722

(22) PCT Filed: May 9, 2022

(86) PCT No.: PCT/JP2022/019618
§ 371 (c)(1),
(2) Date: Nov. 8, 2023

(87) PCT Pub. No.: WO2022/239716
PCT Pub. Date: Nov. 17, 2022

(65) Prior Publication Data

US 2024/0270933 A1 Aug. 15, 2024

(30) Foreign Application Priority Data

May 12, 2021 (JP) ................................ 2021-080742

(51) Int. Cl.

| | |
|---|---|
| ***C08K 3/38*** | (2006.01) |
| ***B32B 1/08*** | (2006.01) |
| ***B32B 27/08*** | (2006.01) |
| ***B32B 27/10*** | (2006.01) |
| ***B32B 27/16*** | (2006.01) |
| ***B32B 27/30*** | (2006.01) |
| ***B32B 27/32*** | (2006.01) |
| ***B65D 65/40*** | (2006.01) |
| ***C08J 5/18*** | (2006.01) |

(52) U.S. Cl.

CPC .................. *C08K 3/38* (2013.01); *B32B 1/08* (2013.01); *B32B 27/08* (2013.01); *B32B 27/10* (2013.01); *B32B 27/16* (2013.01); *B32B 27/306* (2013.01); *B32B 27/308* (2013.01); *B32B 27/32* (2013.01); *B65D 65/40* (2013.01); *C08J 5/18* (2013.01); *B32B 2250/24* (2013.01); *B32B 2250/40* (2013.01); *B32B 2255/10* (2013.01); *B32B 2255/26* (2013.01); *B32B 2307/31* (2013.01); *B32B 2439/46* (2013.01); *B32B 2439/70* (2013.01); *B32B 2457/12* (2013.01); *B32B 2597/00* (2013.01); *C08J 2333/12* (2013.01); *C08K 2003/387* (2013.01)

(58) Field of Classification Search
None
See application file for complete search history.

(56) References Cited

U.S. PATENT DOCUMENTS

| | | | | |
|---|---|---|---|---|
| 2007/0036999 | A1 * | 2/2007 | Rogers Agent ...... | C09D 129/04 427/372.2 |
| 2017/0361581 | A1 | 12/2017 | Nonaka et al. | |
| 2020/0324525 | A1 | 10/2020 | Nonaka et al. | |

FOREIGN PATENT DOCUMENTS

| | | | |
|---|---|---|---|
| JP | 10-272738 | A | 10/1998 |
| JP | 10-330508 | A | 12/1998 |
| JP | 2006-188643 | A | 7/2006 |
| JP | 2015-40307 | A | 3/2015 |
| WO | WO 01/96464 | A1 | 12/2001 |
| WO | WO 2016/104648 | A1 | 6/2016 |
| WO | WO 2017/209212 | A1 | 12/2017 |

OTHER PUBLICATIONS

International Search Report & Written Opinion issued Jul. 19, 2022 in PCT/JP2022/019618 (with English translation), 11 pages.

Sekine, Isao et al., "Corrosion Behavior of Type 304 Stainless Steel in Acetic Acid Solution", Boshoku Gijutsu, vol. 33, No. 9, 1984, pp. 500-503 (with unedited computer-generated English translation).

* cited by examiner

*Primary Examiner* — Sheeba Ahmed
(74) *Attorney, Agent, or Firm* — Oblon, McClelland, Maier & Neustadt, L.L.P.

(57) ABSTRACT

A resin composition comprising: a resin (A) having 30 mol % or more of a structural unit represented by a formula (1) below, and a boron compound (B), the boron compound (B) containing a boron element in an amount of 0.01 to 2,000 μmol per gram of the resin (A).

(1)

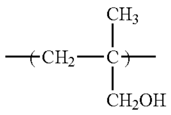

13 Claims, No Drawings

RESIN COMPOSITION, MOLDED BODY USING SAME AND METHOD FOR PRODUCING RESIN COMPOSITION

CROSS REFERENCE TO RELATED APPLICATIONS

This application is a National Stage entry under 35 U.S.C. § 371 of PCT/JP2022/019618, filed on May 9, 2022, and claims priority to JP Patent Application No. 2021-080742, filed on May 12, 2021, the entire contents of which are incorporated herein by reference.

TECHNICAL FIELD

The present invention relates to a resin composition containing a resin having a polymethallyl alcohol unit, and a molded body using the same. Further, the present invention relates to a method for producing the resin composition.

BACKGROUND ART

A gas barrier material using a resin having excellent performance of blocking a gas such as oxygen (gas barrier properties) has been widely used mainly in the fields of packaging materials for a food product, a pharmaceutical, and the like, as a content. Molded bodies, like a packaging material, are generally produced by heating and melt molding, and therefore the resin is required to have thermal stability such as coloration resistance (properties in which coloration such as yellowing is not caused by heat) and long run properties (properties in which physical properties such as viscosity are not changed in long-time melt molding) in addition to the gas barrier properties. When on a layer formed from the resin, another layer is laminated, interlayer adhesive properties are also required so as to prevent easy delamination.

As a resin having favorable gas barrier properties, a vinyl alcohol polymer typified by an ethylene-vinyl alcohol copolymer (hereinafter sometimes abbreviated as EVOH), and a methallyl alcohol polymer have been reported (PTLs 1 and 2). As a resin having further favorable gas barrier properties, a polymethallyl alcohol (hereinafter sometimes abbreviated as PMAL) has been known (PTL 3).

EVOH is suitably used for a gas barrier material, but the thermal stability, interlayer adhesive properties, and gas barrier properties in a high humidity environment of EVOH are not sufficient. For example, PTL 1 discloses that an EVOH composition containing predetermined amounts of carboxylic acid and alkaline earth metal has excellent appearance such as less coloration or less unevenness on a membrane surface, excellent long run properties, and excellent low odor properties during co-extrusion molding or co-injection molding with a resin having high melting point, such as a polyamide or a polyester, or during melt molding at high temperature. However, the use applications and use forms of the EVOH composition are restricted since gas barrier properties are decreased in a high humidity environment. When water vapor barrier properties are required for EVOH, which has low water vapor barrier properties, it is necessary that the EVOH is used in a multilayer structure with a material having excellent water vapor barrier properties.

PTL 2 discloses that a gas barrier material formed from a resin having a methallyl alcohol unit exhibits excellent gas barrier properties at high humidity, and is excellent in transparency and melt moldability. However, there is room for improvement in thermal stability such as coloration resistance and long run properties, and interlayer adhesive properties.

As a material for solving the problems, a polymethallyl alcohol resin composition having excellent gas barrier properties at high humidity and excellent thermal stability (coloration resistance and long run properties), and a molded body using the same have been reported (PTL 3). However, this report describes that it is necessary to add at least one of an acid component in which a logarithm pKa of a reciprocal of an acid dissociation constant at 25° C. is 3.5 to 7.5 and an anion of the acid component for improvement in physical properties (PTL. 3). For example, when sodium acetate is added, acetic acid may be eluted from the resin, and there is a concern about corrosion of stainless and the like used in a facility (NPL1 and PTL 4).

CITATION LIST

Patent Literature

PTL 1: WO2001/096464
PTL 2: JPH10-330508A
PTL 3: WO2016/104648
PTL 4: JP2015-040307A

Non-Patent Literature

NPL1: Isao Sekine et al. "Corrosion Behavior of Type 304 Stainless Steel in Acetic Acid Solution" Boshoku Gijutsu, 33, 500-503 (1984),

SUMMARY OF INVENTION

Technical Problem

It is an object of the present invention to provide a resin composition having excellent coloration resistance, long run properties, interlayer adhesive properties, and gas barrier properties at high humidity, a molded body using the same, and a method for producing the resin composition.

Solution to Problem

The inventors of the present invention have intensively studied, and as a result, found that a resin composition containing a resin having a predetermined amount or more of a structural unit represented by the following formula (1) and a predetermined amount of a boron compound is excellent in thermal stability and has excellent gas barrier properties. Based on the findings, the inventors have further studied and completed the present invention.

Specifically, the present invention provides the following [1] to [11].

[1] A resin composition comprising: a resin (A) comprising 30 mol % or more of a structural unit represented by a formula (1) below, and a boron compound (B), the boron compound (B) comprising a boron element in an amount of 0.01 to 2,000 μmol per gram of the resin (A).

(1)

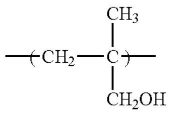

[2] A molded body comprising the resin composition according to [1].

[3] The molded body according to [2], which is a multilayer structure having one or more layers comprising the resin composition according to [1], and one or more other layers.

[4] The molded body according to [2] or [3], which is a multilayer structure comprising one or more layers comprising the resin composition according to [1], and a thermoplastic resin layer laminated on one surface or both surfaces of the one or more layers.

[5] The molded body according to any one of [2] to [4], in which a layer comprising the resin composition according to [1] has a thickness of 0.01 to 1,000 μm.

[6] A film comprising the molded body according to any one of [2] to [5].

[7] A packaging material comprising the film according to [6].

[8] A method for producing a resin composition comprising: a step of bringing a resin (A) having 30 mol % or more of a structural unit represented by a formula (1) below, the boron compound (B) and water into contact with each other.

(1)

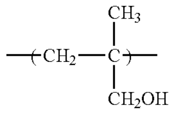

[9] The method for producing a resin composition according to [8], in which the boron compound is sodium borohydride or borax.

[10] The method for producing a resin composition according to [8] or [9], in which in said step, the resin (A) is in a molten state.

[11] The method for producing a resin composition according to [8] or [9], in which in said step, the resin (A) is immersed in an aqueous solution comprising the boron compound (B).

Advantageous Effects of Invention

The present invention can provide a resin composition having excellent coloration resistance, long run properties, interlayer adhesive properties, and gas barrier properties at high humidity, a molded body using the same, and a method for producing the resin composition.

DESCRIPTION OF EMBODIMENTS

Hereinafter, the present invention will be described in detail. In the present description, preferable provision can be optionally adopted, and a combination of preferable provisions is more preferred. In the description, "XX to YY" means "XX or more and YY or less".

In the following Production Examples, Examples, and Comparative Examples, "part(s)" means part(s) by mass unless otherwise specified.

<Resin Composition>

A resin composition of the present invention is a resin composition containing a resin (A) having 30 mol % or more of a structural unit represented by the following formula (1), and a boron compound (B), the boron compound (B) containing a boron element in an amount of 0.01 to 2,000 μmol per gram of the resin (A).

(1)

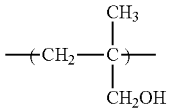

Since the resin (A) having 30 mol % or more of the structural unit represented by the formula (1) has a quaternary carbon on its main chain, the rotational motion of the main chain is restricted. Accordingly, the diffusion of gas molecules in the resin is slowed, and the resin exhibits high barrier properties even at high humidity. Since the resin composition of the present invention contains a boron element contained in the boron compound (B) in a predetermined amount per gram of the resin (A), a hydroxy group in the structural unit represented by the formula (1) is coordinated to the boron element. Although a reason for improvement in thermal stability is not clear, it is assumed that when the boron compound (B) is blended, the hydroxy group in the structural unit represented by the formula (1) and boron form a coordination bond to protect the hydroxy group, and thermal stability (coloration resistance and long run properties) is improved.

[Resin (A)]

The resin (A) has 30 mol % or more of the structural unit represented by the formula (1).

From the viewpoint of gas barrier properties, the content of the structural unit represented by the formula (1) contained in the resin (A) is preferably 45 mol % or more more preferably 70 mol % or more, further preferably 80 mol % or more, still further preferably 90 mol % or more, and particularly preferably 95 mol % or more, and may be 99.9 mol % or more. Although the content may be 100 mol %, in consideration of moldability or the like, the content is preferably 99.9 mol % or less, and may be 99 mol % or less, 98 mol % or less, or 95 mol % or less.

The resin (A) may be a copolymer having the structural unit represented by the formula (1) and a structural unit other than the structural unit represented by the formula (1). The structural unit other than the structural unit represented by the formula (1) is not particularly limited as long as it does not highly and adversely affect gas barrier properties and thermal stability. The other structural unit may include a structural unit derived from a monomer (M) illustrated below.

Examples of the monomer (M) include hydroxy group-containing monomers such as allyl alcohol, vinyl alcohol, 1-butene-3,4-diol, and 2-methylene-1,3-propanediol; (meth)acrylic acid ester monomers such as methyl (meth)acrylate, ethyl (meth)acrylate, and butyl (meth)acrylate; carboxy group-containing monomers such as (meth)acrylic acid and crotonic acid; olefin monomers such as ethylene, propylene, 1-butene, isobutene, 1-pentene, 1-hexene, and 1-octene; diene monomers such as butadiene and isoprene; aromatic substituted vinyl monomers such as styrene, α-methylstyrene, o-, m-, and p-methylstyrenes, and vinylnaphthalene; vinyl ether monomers such as methyl vinyl ether, ethyl vinyl ether, and butyl vinyl ether; vinyl halide monomers such as vinyl chloride and vinyl fluoride; vinylidene halide monomers such as vinylidene chloride and vinylidene fluoride; nitrile monomers such as acrylonitrile and methacrylonitrile; and maleic acid derivative monomers such as maleimide, N-methyl maleimide, N-ethyl maleimide, N-cyclohexyl maleimide, and dimethyl maleate. In addition to the structural unit represented by the formula (1), the resin (A) may have one type of the other structural unit alone or two or more types thereof.

The lower limit value of the melt flow rate (MFR) of the resin (A) is a measured value at a temperature of 210° C. and a load of 2,160 g, and is preferably 0.01 g/10 min, more preferably 0.05 g/10 min, further preferably 0.1 g/10 min, and particularly preferably 0.3 g/10 min. Whereas the upper limit value of the MFR is a measured value under the same condition, and is preferably 200 g/10 min, more preferably 50 g/10 min, further preferably 30 g/10 min, particularly preferably 15 g/10 min, and the most preferably 10 g/10 min. When the MFR is adjusted within the aforementioned range, the resin composition can be easily melt-molded, and the coloration resistance and long run properties of the resin composition can be enhanced. Examples of a method for adjusting the MFR within the range include a method for adjusting the degree of polymerization of the resin (A) and a method for controlling the type of component for copolymerization. In view of the gas barrier properties, coloration resistance, long run properties of the resin composition and a molded body formed from the resin composition, and the like, it is preferable that not only the resin (A) by itself, but also the resin composition containing the resin (A) and the molded body have a MFR falling within the range. The number average degree of polymerization of the resin (A) is preferably 100 to 10,000.

The resin (A) can be produced by a known method. The production method is not particularly limited, and examples thereof include the following first to third methods.

The first method is a method for reducing a polymer obtained by homopolymerization of a monomer represented by the following formula (2) or a copolymer obtained by copolymerization of the monomer represented by the formula (2) with the monomer (M).

(2)

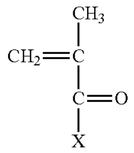

In the formula (2), X represents any one selected from the group consisting of a hydrogen atom, an alkoxy group having 1 to 12 carbon atoms, a hydroxy group, and a halogen atom.

Specific examples of the monomer represented by the formula (2) include methacrylic acid, a halide of methacrylic acid, a methacrylic acid ester such as methyl methacrylate, and methacrolein.

Examples of a method for polymerizing the monomer include known polymerization methods such as radical polymerization and anionic polymerization.

Examples of an initiator for radical polymerization include azo initiators such as 2,2'-azobisisobutylonitrile, 2,2'-azobis(2,4'-dimethylvaleronitrile), and 2,2'-azobis(4-methoxy-2,4'-dimethylvaleronitrile); and peroxide initiators such as isobutyl peroxide, di-n-propyl peroxydicarbonate, and t-butyl peroxypivalate. A polymerization temperature is normally about room temperature to 100° C.

As an initiator for anionic polymerization, a basic alkali metal or alkaline earth metal derivative such as butyl lithium, lithium aluminum hydride, methyl magnesium bromide, ethyl magnesium chloride, or triphenylmethyl calcium chloride can be used. The anionic polymerization is normally carried out in an aprotic solvent such as tetrahydrofuran, dimethoxyethane, or diethyl ether at a low temperature of about −100° C. to room temperature.

Examples of the method for reducing the obtained polymer or copolymer include a method using as a reductant a metal hydride such as lithium aluminum hydride, sodium borohydride, lithium borohydride, or diborane; and a hydrogeneration method using a transition metal catalyst such as a ruthenium-based, rhodium-based, nickel-based, palladium-based, or platinum-based catalyst. A solvent for a reduction reaction is appropriately selected in view of solubility of the polymer or copolymer and reactivity with the reductant. Specific examples of the solvent for a reduction reaction include tetrahydrofuran, N-methylmorpholine, dimethylacetamide, dimethylformamide, dimethyl sulfoxide, dimethoxyethane, methanol, ethanol, and propanol. A temperature of the reduction reaction is normally about room temperature to 200° C., and preferably 50 to 150° C. When a syndiotactic or isotactic polymer or copolymer is reduced, the resin (A) that maintains its stereoregularity can be obtained.

Examples of a method for adjusting the content of the structural unit represented by the formula (1) in the resin (A) include a method in which the amount of the reductant is adjusted in the reduction reaction and a method in which a hydrogenation condition is changed.

The second method is a method for homopolymerizing a monomer represented by the following formula (3) or copolymerizing the monomer represented by the formula (3) with the monomer (M).

(3)

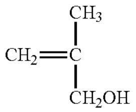

When the monomer represented by the formula (3) is polymerized, a hydrogen atom of a hydroxy group in the monomer may be substituted by an acyl group. As the polymerization method, the polymerization method described in the first method can be adopted. When after polymerization, a saponification treatment is carried out, the resin (A) having the structural unit represented by the formula (1) can be obtained. As a method for polymerizing methallyl alcohol, for example, a method described in US3,285,897B, US3,666,740B to which JPS47-40308B corresponds, GB854207A, or the like, can be used.

The third method is a method in which a monomer represented by the following formula (4) is homopolymerized or the monomer represented by the formula (4) is copolymerized with the monomer (M), and Z that is a halogen atom in the following formula (4) is converted to a hydroxy group. As the third method, for example, a method described in U.S. Pat. No. 4,125,694B can be used.

(4)

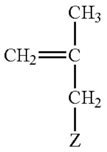

In the formula (4), Z represents a halogen atom.

[Boron Compound (B)]

The resin composition of the present invention contains the boron compound (B), and the amount of boron element contained in the boron compound (B) is 0.01 to 2,000 μmol per gram of the resin (A). Since the resin composition contains the boron element, the thermal stability (coloration resistance and long run properties) of the resin composition and the molded body containing the resin composition can be significantly improved.

In the resin composition of the present invention, the boron compound (B) may contain another element as long as it does not impair the effects of the present invention. Examples of the other element include lithium, sodium, and aluminum.

Examples of the boron compound (B) include, but not particularly limited to, boric acids such as orthoboric acid ($H_3BO_3$), metaboric acid, and tetraboric acid; boric acid esters such as triethyl borate and trimethyl borate; alkali metal salts of the boric acids, alkaline earth metal salts of the boric acids, and boric acid salts such as borax; boron hydride compounds such as diborane, a borane-dimethyl sulfide complex, a borane-tetrahydrofuran complex, and a borane-triethylamine complex; sodium borohydride, lithium borohydride, nickel borohydride, zinc borohydride, lithium tri (see-butyl)borohydride, sodium triacetoxyborohydride, and lithium triethylborohydride.

Among these, from the viewpoint of availability and simple addition as an aqueous solution, the boron compound (B) is preferably any one selected from the group consisting of orthoboric acid ($H_3BO_3$), metaboric acid, tetraboric acid, an alkali metal salt of orthoboric acid, an alkaline earth metal salt of orthoboric acid, borax, and sodium borohydride, and more preferably any one selected from the group consisting of orthoboric acid ($H_3BO_3$), borax, and sodium borohydride.

In the resin composition of the present invention, the content of the boron element contained in the boron compound (B) is 0.01 μmol or more per gram of the resin (A). From the viewpoint of improving thermal stability, the content of the boron element is preferably 0.1 μmol or more, more preferably 0.2 μmol or more, and further preferably 2 μmol or more. The content of the boron element is 2,000 μmol or less. From the viewpoint of significantly improving thermal stability (coloration resistance and/or long run properties), the content of the boron element is preferably 1,500 μmol or less, more preferably 1,000 μmol or less, still more preferably 800 μmol or less, still more preferably 500 μmol or less, still more preferably 300 μmol or less, and particularly preferably 200 μmol or less. When the content of the boron element contained in the boron compound (B) is less than 0.01 μmol per gram of the resin (A), an improvement in thermal stability is not recognized. When the content of the boron element contained in the boron compound (B) is more than 2,000 μmol per gram of the resin (A), the thermal stability is decreased.

[Other Component]

The resin composition of the present invention may contain a component other than the resin (A) and the boron compound (B), if necessary. Examples of the other component include additives such as an antioxidant, an ultraviolet absorber, a plasticizer, an antistat, a thermal stabilizer containing no metal, a lubricant, a colorant, a filler, another polymer compound (e.g., another thermoplastic resin), and a solvent (water or various organic solvents). One type or two or more types of the other components can be blended and contained as long as the other components do not impair the effects of the present invention. The content of the other polymer compound is normally 50 mass % or less, and preferably 20 mass % or less, relative to the content of the resin (A).

The melt flow rate (MFR) of the resin composition of the present invention is not particularly limited. The melt flow rate (MFR) at a temperature of 230° C. and a load of 2.16 kg is preferably 3.0 g/10 min or more, more preferably 6.0 g/10 min or more, and further preferably 7.0 g/10 min. Thus, processability during secondary molding is improved without impairing the effects of the present invention.

The ratio ((B)/(OH)) of a content (B) that is the amount of the boron element contained in the resin composition of the present invention to a hydroxy group content (OH) in the resin (A) represents the amount by mole of the boron element per mole of the hydroxy group, is not particularly limited, and is preferably $0.005\times10^{-6}$ or less, more preferably $0.003\times10^{-6}$ or less, and further preferably $0.001\times10^{-6}$ or less. Thus, processability during melt molding is improved without impairing the effects of the present invention.

From the viewpoint of gas barrier properties in a high humidity environment, the oxygen permeability of the resin composition at a temperature of 20° C. and a relative humidity of 100% is preferably 60 mL·20 μm/($m^2$·day·atm) or less, more preferably 40 mL·20 μm/($m^2$·day·atm) or less, further preferably 20 mL·20 μm/($m^2$·day·atm) or less, and particularly preferably 10 mL·20 μm/($m^2$·day·atm) or less. As the oxygen permeability of the resin composition is lower, a multilayer structure formed can also achieve more favorable barrier performance in a high humidity environment.

<Molded Body>

A molded body of the present invention contains the resin composition of the present invention. Therefore, a molded body having excellent coloration resistance, long run properties, interlayer adhesive properties, and gas barrier properties at high humidity is obtained. The molded body of the present invention may be a single-layer structure or a multilayer structure containing another layer.

The molded body of the present invention includes one or more layers containing the resin composition of the present invention (suitably layers formed from the resin composition). Specific examples thereof include a single-layer structure that includes a single layer containing the resin composition; a multilayer structure that includes one or more layers containing the resin composition and one or more other layers different from the one or more layers; a multilayer structure that includes one or more layers containing the resin composition and a thermoplastic resin layer laminated on one surface or both surfaces of the one or more layers; and a multilayer structure that includes two or more layers containing the resin composition and does not include the other layer.

Examples of suitable layer configuration of the multilayer structure include P/T, T/P/T, P/Ad/T, and T/Ad/P/Ad/T in which P is the layer containing the resin composition of the present invention, Ad is a layer formed from an adhesive resin (adhesive resin layer), and T is a layer formed from a thermoplastic resin (thermoplastic resin layer). Each of the layers may be a single layer or a multilayer. An adhesive layer can be interposed in place of the adhesive resin layer.

In particular, the molded body that is the multilayer structure having one or more layers containing the resin composition of the present invention and one or more other layers different from the one or more layers is excellent in coloration resistance, long run properties, interlayer adhesive properties, and gas barrier properties at high humidity.

The molded body that is the multilayer structure having one or more layers containing the resin composition of the present invention and a thermoplastic resin layer laminated on one surface or both surfaces of the one or more layers is excellent in coloration resistance, long run properties, interlayer adhesive properties, and gas barrier properties at high humidity.

The thickness of the layer containing the resin composition that constitutes the molded body is preferably 0.01 to 1,000 μm. When the thickness of the layer falls within the aforementioned numerical range, the molded body having excellent coloration resistance, long run properties, interlayer adhesive properties, and gas barrier properties at high humidity is obtained.

A method for producing the multilayer structure is not particularly limited, and examples thereof include the following methods i) to iv).

i) A method in which a thermoplastic resin is melt-extruded on the layer P (film, sheet, etc.) to form the thermoplastic resin layer T on the layer P.

ii) A method in which the resin composition of the present invention and another thermoplastic resin are co-extruded or co-injected to form a layer configuration of P/T or T/P/T.

iii) A method in which the layer P and the thermoplastic resin layer T (film, sheet, etc.) are laminated through the adhesive resin layer Ad or the adhesive layer. When the adhesive resin layer Ad is used, the multilayer structure can also be produced by co-extrusion or co-injection, similarly to the method ii). Another substrate (film, sheet, etc.) can be used in place of the thermoplastic resin layer T.

iv) A method in which a homogeneous solution including the resin composition and a solvent is applied to a substrate, and the solvent is vaporized from the resulting coated surface to form the layer P. The substrate is not particularly limited, and may be the thermoplastic resin layer T (film, sheet, etc.), the adhesive resin layer Ad obtained by coating the thermoplastic resin layer T, or another substrate (film, sheet, etc.).

Examples of the thermoplastic resin used in the other layer in the multilayer structure include homopolymers or copolymers of olefins such as a linear low-density polyethylene, a low-density polyethylene, a medium-density polyethylene, a high-density polyethylene, an ethylene-vinyl acetate copolymer, an ethylene-propylene copolymer, a polypropylene, a propylene-α-olefin copolymer (e.g., an α-olefin having 4 to 20 carbon atoms), a polybutene, and a polypentene; an ethylene-vinyl alcohol copolymer; polyesters such as polyethylene terephthalate; a polyester elastomer; polyamides such as Nylon 6 and Nylon 66; a polystyrene; a polyvinyl chloride; a polyvinylidene chloride; a (meth)acrylic resin; a vinyl ester resin; a polyurethane elastomer; a polycarbonate; a chlorinated polyethylene; and a chlorinated polypropylene. Among these, a polyethylene, an ethylene-vinyl acetate copolymer, an ethylene-propylene copolymer, a polypropylene, a polyester, a polyamide, or a polystyrene is preferably used.

The adhesive resin forming the adhesive resin layer Ad is not particularly limited as long as it has adhesive properties to the resin composition of the present invention and the thermoplastic resin. The adhesive resin is preferably an adhesive resin containing a carboxylic acid-modified polyolefin. As the carboxylic acid-modified polyolefin, a carboxy group-containing modified olefin polymer obtained by chemically bonding an olefinic polymer with an ethylenically unsaturated carboxylic acid, or an ester or an anhydride thereof (e.g., by an addition reaction or a graft reaction) can be suitably used. The olefinic polymer used herein means a polyolefin such as a polyethylene (low pressure, medium pressure, or high pressure), a linear low-density polyethylene, a polypropylene, or a polybutene; or a copolymer of olefin with another monomer (a vinyl ester, an unsaturated carboxylic acid ester, etc.) (e.g., an ethylene-vinyl acetate copolymer, or an ethylene-ethyl acrylate ester copolymer). Among these, a linear low-density polyethylene, an ethylene-vinyl acetate copolymer (e.g., vinyl acetate content: 5 to 55 mass %), and an ethylene-acrylic acid ethyl ester copolymer (e.g., acrylic acid ethyl ester content: 8 to 35 mass %) are preferable, and a linear low-density polyethylene and an ethylene-vinyl acetate copolymer are more preferable. Examples of the ethylenically unsaturated carboxylic acid, or an ester or an anhydride thereof include an ethylenically unsaturated monocarboxylic acid or an ester thereof, and an ethylenically unsaturated dicarboxylic acid, a monoester or diester thereof, or an anhydride thereof. In particular, an ethylenically unsaturated dicarboxylic anhydride is preferable. Specific examples thereof include maleic acid, fumaric acid, itaconic acid, maleic anhydride, itaconic anhydride, a maleic acid monomethyl ester, a maleic acid monoethyl ester, a maleic acid diethyl ester, and a fumaric acid monomethyl ester. In particular, maleic anhydride is suitable.

As an adhesive forming the adhesive layer, a known adhesive containing as an adhesive component an organotitanium compound, an isocyanate compound, or a polyester compound can be used.

Among the methods i) to iv), the method for co-extruding the resin composition of the present invention and the other thermoplastic resin is preferably used. A co-extrusion method is not particularly limited, and examples thereof include a multimanifold-merging T die method, a feedblock-merging T die method, and an inflation method.

Among the methods i) to iv), the method in which a homogeneous solution including the resin composition and a solvent is applied to a substrate is also preferable. The concentration of the resin composition in the homogeneous solution is not particularly limited, and is preferably 5 to 50 mass %. When the concentration is less than 5 mass %, drying load may be increased. In contrast, when the concentration is more than 50 mass %, viscosity is increased, and handleability may be deteriorated. The solvent is not particularly limited as long as it is capable of dissolving the resin composition, and ethanol, 1-propanol, or the like is suitably used. The temperature of a coating agent during coating is suitably 20 to 80° C. A coating method is not particularly limited, and a known method such as a gravure roll coating method, a reverse gravure coating method, a reverse roll coating method, or a Meyer bar coating method is suitably used.

The multilayer structure may be subjected to secondary processing to obtain the molded body. The shape and form of the molded body obtained by secondary processing are not particularly limited, and a typical molded body includes the following molded bodies a) to d).

a) A multilayer stretched sheet or film obtained by stretching the multilayer structure (sheet, film, etc.) in a uniaxial or biaxial direction and heat-treating the multilayer structure.

b) A multilayer rolled sheet or film obtained by rolling the multilayer structure (sheet, film, etc.).

c) A multilayer tray cup-shaped container obtained by subjecting the multilayer structure (sheet, film, etc.) to thermoforming processing such as vacuum molding, air-pressure molding, or vacuum air-pressure molding.

d) A bottle or cup-shaped container or the like obtained by subjecting the multilayer structure (pipe, etc.) to stretch blow molding or the like.

The secondary processing method is not limited to the methods exemplified to obtain the molded products described above. For example, a known secondary processing method other than the methods described above, such as blow molding, can be appropriately used.

Since the molded body that is the single-layer structure or the multilayer structure is excellent in gas barrier properties, the molded body is suitable for a use application that takes advantage of such properties. Examples of the use application of the molded body include a single-layered or multi-layered film or sheet, a pipe, a tube, a container (a deep-drawn container, a bottle, a cup, a tank, a pouch, a bag, a blister pack, etc.), and a fiber. In the use applications, the shape and form of the molded body are not particularly limited. The molded body used in the use applications may be a single-layer structure or a multilayer structure. The molded body of the present invention can be suitably used as a packaging material for a food product, a packaging material for a pharmaceutical, or the like.

Among these use applications, the molded body can be suitably used as a film in terms of achieving both gas barrier properties and molding processability, and a film containing the molded body of the present invention is an aspect of the present invention.

[Method for Molding Molded Body]

A method for molding the molded body is not particularly limited, and a variety of molding method such as melt molding (extrusion molding, injection molding, blow molding, etc.), solution molding, or powder molding can be used. Melt molding is preferable. According to the resin composition of the present invention, even when the molded body is produced by melt molding, the molded body can be stably and continuously produced for an extended period of time with coloration such as yellowing being suppressed. In addition, interlayer adhesive properties during formation of the molded body that is a multilayer structure can be improved, and thus the durability of the molded body can be improved. The molded body of the present invention hardly generates fish eyes, streaks, gel, particles, and the like, and may be excellent in appearance properties other than coloration. By using the molded body of the present invention, a multilayer structure having excellent appearance properties, long run properties, and interlayer adhesive properties can be obtained. In melt molding, a temperature at which the resin composition is molten is preferably about 100 to 300° C. When the temperature is higher than 300° C., the resin (A) in the resin composition may be thermally deteriorated or decomposed. When the temperature is lower than 100° C., the resin composition is difficult to melt.

[Use Application]

A use application of the molded body of the present invention will be described.

The molded body of the present invention can be suitably used as a packaging material. A packaging material including the film is an aspect of the present invention. The packaging material may be formed from only the molded body of the present invention, or from a multilayer structure other than the present invention and another member.

A packaging material of the present invention can be produced by a known method. For example, a sheet-shaped multilayer structure including the layer containing the resin composition of the present invention or a film material including the multilayer structure (hereinafter, also simply referred to as a "film material") is joined and molded into a predetermined container shape, and thus a container (packing material) may be produced. The packaging material of the present invention can be applied to various use applications by adopting excellent gas barrier properties and water vapor barrier properties of the packaging material. The packaging material is preferably used in a use application in which barrier properties against oxygen are necessary or a use application in which the inside of the packaging material is replaced by various functional gases. For example, the packaging material of the present invention is preferably used as a packaging material for a food product. In addition to the packaging material for a food product, the packaging material of the present invention is preferably used as a packaging material for packaging a drug such as an agricultural chemical or a pharmaceutical; a medicine device; an industrial material such as a mechanical component or a precision material; clothing, or the like.

The molded body of the present invention may be used for an electronic device such as a solar cell or a display. For example, when the molded body is used for a solar cell, the molded body of the present invention is used as a member of the solar cell. When the molded body is used for a display, the molded body of the present invention is used as a member of the display.

The molded body or film of the present invention may be subjected to secondary processing into various molded products. Examples of the molded products include a vertically-made, filled, and sealed bag, a pouch, a vacuum insulator, a vacuum packaging bag, a bottle, a cup-shaped container, a blister pack, a tank, a bag, a laminate tube container, an infusion solution bag, a lid member for a container, a paper container, a strip tape, and an in-mold label. Hereinafter, the molded products will each be described.

(Vertically-Made, Filled, and Sealed Bag)

The molded body or film of the present invention may be used for a vertically-made, filled, and sealed bag. The vertically-made, filled, and sealed bag is formed by sealing a multilayer structure constituting the molded body at three sides including two edges and a body. The vertically-made, filled, and sealed bag can be produced with a vertical bag making and filling machine. Various methods for producing a bag with the vertical bag making and filling machine are applied. However, in any methods, a content is supplied to the bag through an upper opening of the bag, and the opening is sealed to produce the vertically-made, filled, and sealed bag. For example, the vertically-made, filled, and sealed bag is formed from one film material heat-sealed at three sides including an upper edge, a lower edge, and a side. The vertically-made, filled, and sealed bag that is a container according to the present invention is excellent in gas barrier properties and water vapor barrier properties, and the barrier performance is maintained even after a retort treatment. Therefore, the vertically-made, filled, and sealed bag can suppress deterioration in the quality of the content over an extended period of time.

(Pouch)

The molded body or film of the present invention may be used for a pouch. In the present description, the "pouch" means a container that mainly includes a food product, a daily necessity, or a pharmaceutical as a content and has a film material as a wall member. In terms of the shape and use application of the pouch, examples of the pouch include a spout pouch, a zipper-scaled pouch, a flat pouch, a stand-up pouch, a horizontally-made, filled, and scaled pouch, and a retort pouch. For example, a flat pouch is formed by joining peripheries of two multilayer structures that each constitute the molded body to each other. The pouch may be formed by laminating a barrier multilayer structure and at least one other layer. The pouch is excellent in gas barrier properties, and maintains its barrier performance even after a retort treatment. Therefore, the use of the pouch can prevent alteration of a content over an extended period of time even after transportation or long storage. In one example of the pouch, transparency can be well kept, and therefore confirmation of the content and confirmation of alteration of the content due to deterioration are easy.

(Vacuum Insulator)

The molded body or film of the present invention can also be used for a vacuum insulator. The vacuum insulator is produced by disposing a core material in an inside of the multilayer structure so as to be surrounded by the multilayer structure and bonding the periphery thereof. In this state, when the pressure of the inside is reduced, the multilayer structure is brought in close contact with the core material due to a pressure difference. The material and shape of the core material are not particularly limited as long as they are appropriate for thermal insulation. Examples of the core material include a perlite powder, a silica powder, a precipitated silica powder, diatomaceous earth, calcium silicate, glass wool, rock wool, artificial (synthetic) wool, and a resin foam body (e.g., styrene foam and urethane foam). As the core material, a hollow container molded in a predetermined shape, a honeycomb structure, or the like can be used, and the core material may also be granular.

The vacuum insulator that is thinner and lighter than an insulator formed from urethane foam can achieve thermal insulation properties equal to the thermal insulation properties of the insulator formed from urethane foam. Since the vacuum insulator can keep an insulation effect over an extended period of time, the vacuum insulator can be used for a heat insulating material for household electrical appliances such as a refrigerator, hot-water supply equipment, and a rice cooker, a residential heat insulating material used in a wall, a ceiling, an attic, a floor, and the like, a vehicle sealing material, a heat insulating panel for a heat storage device, a vending machine, and the like, and a heat transfer device such as a heat pump-applied device.

(Electronic Device)

The molded body or film of the present invention are excellent in barrier properties against water vapor, in addition to gas barrier properties. In particular, when the molded body or film of the present invention is used for an electronic device, the properties may highly contribute to the durability of the electronic device. Examples of the electronic device include photoelectric converters such as a solar cell; information display devices having a display, such as an organic EL display, a liquid crystal display (LCD), and an electronic paper; and lighting devices such as an organic EL light-emitting element.

Examples of the solar cell include a silicon solar cell, a compound semiconductor solar cell, and an organic thin film solar cell. Examples of the silicon solar cell include a single crystal silicon solar cell, a polycrystalline silicon solar cell, and an amorphous silicon solar cell. Examples of the compound semiconductor solar cell include a group III-V compound semiconductor solar cell, a group II-VI compound semiconductor solar cell, and a group I-III-VI compound semiconductor solar cell. Examples of the organic thin film solar cell include a pn hetero junction organic thin film solar cell and a bulk heterojunction organic thin film solar cell. The solar cell may also be an integrated solar cell having a plurality of unit cells connected in series.

Examples of the molded body or film used for the electronic device include display members such as an LCD substrate film, an organic EL display substrate film, an electronic paper substrate film, an electronic device sealing film, and a PDP film; electronic device-related members such as an LED film, an IC tag film, and solar cell members including a solar battery module, a solar cell backsheet, and a solar cell protective film; an optical communication member, an electronic device flexible film, a fuel battery diaphragm, a fuel battery sealing film, and a substrate film for various functional films. When the multilayer structure is used as a member of a display, for example, the multilayer structure is used as a low reflective film.

As an example, an electronic device including the molded body or the film of the present invention includes an electronic device body, a sealing material, and a protective sheet including the multilayer structure, and the protective sheet is disposed so as to protect a surface of the electronic device body. The protective sheet may be disposed directly on one surface of the electronic device body, or may be disposed on the electronic device body through another member such as the sealing member. The protective sheet may consist of only the multilayer structure, or may include the multilayer structure and another member (e.g., another layer) laminated on the multilayer structure. The thickness and material of the protective sheet are not particularly limited as long as the protective sheet is a layered body appropriate for protection of the surface of the electronic device and includes the multilayer structure described above. The sealing material may cover the whole surface of the electronic device body, and is an optional member that is appropriately added according to the type and use application of the electronic device body. As the sealing material, an ethylene-vinyl acetate copolymer, polyvinyl butyral, or the like is used. The protective sheet may be disposed also on a surface opposite to the surface on which the protective sheet is disposed.

The electronic device body can be produced by a so-called roll-to-roll process depending on the type of the electronic device body. In the roll-to-roll process, a flexible substrate (e.g., a stainless substrate and a resin substrate) wound around a feeding roll is fed, and an element is formed on the substrate to produce the electronic device body, and the electronic device body obtained is wound around a winding roll. In this case, the protective sheet is desirably prepared in a form of a flexible long sheet, more specifically in a form of a wound body of a long sheet. In one example, the protective sheet fed from the feeding roll is laminated on the electronic device body before the electronic device body is wound around the winding roll, and is wound with electronic device body. In another example, the electronic device body wound around the winding roll may be fed again from the roll and the protective sheet may be laminated. In one preferable example of the present invention, the electronic device itself is flexible.

(Blister Pack)

The molded body or film of the present invention can also be used for a blister pack. In the present description, the blister pack means a tablet-packaging body particularly used for a pharmaceutical. Although the shape of the tablet-packaging body is not particularly considered, a sealed space that can store a content can be formed by bonding a lid member to an edge of a tray having a housing section. A method for molding a tray is not particularly limited. However, a housing space and an edge around the housing space can be formed by secondarily molding the molded body or film of the present invention to form a depression. Specifically, vacuum molding, air-pressure molding, air-pressure vacuum molding, plug-assist air-pressure molding, plug-assist vacuum molding, plug-assist air-pressure vacuum molding, plug molding, press molding, or the like can be used. The lid member is not particularly limited as long as it is bonded to the tray. For example, the molded body or film of the present invention, aluminum, a transparent deposition film, or the like can be used. Since the blister pack using the molded body or film of the present invention is excellent in gas barrier properties, alteration of a content can be prevented over an extended period of time. In one example of the blister pack, transparency can be well kept, confirmation of the content or confirmation of alteration of a content due to deterioration is easy.

<Method for Producing Resin Composition>

In production of the resin composition of the present invention, a known method can be adopted. For example, the method includes a method in which the structural unit derived from the formula (1) is contained in the resin by bringing the boron compound (B) in contact with the resin (A) or a reduction treatment using sodium borohydride, and the resin is used as the resin composition as it is. However, the resin composition can also be obtained by a method for producing the resin composition described below.

A method for producing the resin composition of the present invention includes a step of bringing the resin (A) having 30 mol % or more of the structural unit represented by the formula (1), the boron compound (B) and water into contact with each other. By using the method of the present invention, a resin composition having excellent thermal stability and interlayer adhesive properties can be more surely produced. Hereinafter, the resin (A) having 30 mol % or more of the structural unit represented by the formula (1) may simply be abbreviated as the resin (A).

The resin (A) having 30 mol % or more of the structural unit represented by the formula (1) and the boron compound (B) are the same as described above and an explanation thereof is omitted here. From the viewpoint of surely performing a treatment and convenience, the boron compound (B) is preferably sodium borohydride or borax.

In the step of bringing the resin (A) having 30 mol % or more of the structural unit represented by the formula (1). the boron compound (B) and water into contact with each other, a contact order of components is not limited as long as the effects of the present invention are not impaired. It is preferable that the resin (A) is immersed into an aqueous solution containing the boron compound (B).

In the aqueous solution containing the boron compound (B), the boron compound (B) may be dissolved in water, or the boron compound (B) may be dispersed in water.

In the step, a solvent other than water may be used as long as the effects of the present invention are not impaired. When the solvent other than water is used, the solvent other than water may be added to the aqueous solution containing the boron compound (B), or the boron compound may be added to water and the solvent other than water and used.

In the step, another component may be blended. Examples of the other component are the same as described above and an explanation thereof is omitted here. An addition order of the other component is not limited as long as the effects of the present invention are not impaired.

A treatment in which the resin (A) is immersed in the aqueous solution containing the boron compound (B) may be in a batch mode or a continuous mode. When the treatment is carried out in a batch mode, the mass ratio (bath ratio) of the aqueous solution containing the boron compound (B) to the resin (A) is preferably 3 or more, more preferably 10 or more, and further preferably 20 or more. In a continuous mode, a tower-type device can be suitably used. A suitable range of immersion time varies depending on the shape and form of the resin (A). When the resin (A) has a particulate shape having an average diameter of about 1 to 10 mm, the immersion time is 1 hour or more, and preferably 2 hours or more.

The resin composition obtained by the production method of the present invention can be used as it is as a material for a molded body, and it is preferable that water (or the solvent) be removed from the resin composition and the resin composition be dried. From the viewpoint of preventing molding troubles such as generation of voids due to foaming during molding processing, the moisture content of the dried resin composition is preferably 1.0 mass % or less, more preferably 0.8 mass % or less, and further preferably 0.5 mass % or less, relative to the whole resin composition.

A drying method is not particularly limited, and suitable examples thereof include static drying and fluidized drying. A single drying method may be used, or a plurality of methods may be combined. For example, fluidized drying is carried out, and static drying is then carried out. A drying treatment may be in a continuous mode or a batch mode. When a plurality of drying processes is combined, the mode of each of the drying processes can be freely selected from the continuous mode and the batch mode. Drying under a low oxygen concentration, in an oxygen-free state, or in a nitrogen atmosphere is preferable since deterioration of the resin composition due to oxygen during drying can be decreased. In particular, drying in a nitrogen atmosphere is preferable.

When the content of the boron compound (B) in the obtained resin composition is too high, thermal stability is decreased. Therefore, cleaning may be carried out, if necessary, to adjust the content of the boron compound (B). A cleaning method is not particularly limited, and an industrially usable method is a method in which the resin composition is stirred in water or a method in which steam is applied to the resin composition.

In the step of the method for producing the resin composition of the present invention, a reaction solution after a reaction of the resin (A) with the boron compound (B) may be added to water. When the reaction solution comes in contact with water, the resin composition is obtained as a precipitate. In the reaction of the resin (A) with the boron compound (B), a solvent such as tetrahydrofuran, toluene, or methanol, or another component may be blended. Each of the solvent and the other component may be used alone, or two or more types thereof may be used in combination. The temperature in the reaction of the resin (A) with the boron compound (B) is preferably 60 to 150° C., and more preferably 80 to 130° C. When the reaction temperature falls within the aforementioned range, the reaction favorably proceeds.

The step of the method for producing the resin composition of the present invention can be applied to the resin (A) in a molten state.

In the case of melting the resin (A) and producing the resin composition of the present invention, a device such as a kneader or an extruder is used.

When raw materials are supplied to the device, the resin (A) is molten in the device, and the aqueous solution containing the boron compound (B) may be brought in contact with the molten resin (A). The resin (A) and the boron compound (B) are dry blended, and heated or molten, and water may be added to this resultant. At that time, the resin (A) and the boron compound (B) may be dissolved in water or dispersed in water.

In the case of melting the resin (A) and producing the resin composition, the solvent other than water and the other component may be blended. A blending order of the solvent other than water and the other component is not particularly limited. A plurality of liquids containing each of the solvent other than water and the other component may be prepared, or a liquid containing two or more types of components (e.g., a liquid containing all component to be mixed) may be prepared.

The temperature at which the resin (A) is molten is preferably about 100 to 300° C. When the temperature is 300° C. or lower, the resin (A) may not be thermally deteriorated or decomposed. Since the melting point of the resin (A) containing water is lower than that of the resin (A) dried, the resin (A) containing water can be molten at lower temperature. When the temperature is 100° C. or higher, the resin (A) is easily molten.

In the case of melting the resin (A) and producing the resin composition of the present invention, a resin composition in which voids are hardly generated can be obtained by drying according to the content of the solvent or the moisture content. A drying method is the same as described above and an explanation thereof is omitted here.

EXAMPLES

Hereinafter, the present invention will be more specifically described using Examples, but is not limited to these Examples. Each evaluation in Examples and Comparative Examples was carried out in accordance with a method described below.

Method for Identifying Structure of Resin (A)

The structure of a resin (A) was identified by $^{1}$H-NMR and $^{13}$C-NMR. Measurement conditions are shown below.

($^{1}$H-NMR Measurement Condition)

Observation frequency: 600 MHZ
Solvent: DMSO-d6
Polymer concentration: 5 mass %
Measurement temperature: 80° C.
Integration count: 512 times
Pulse delay time: 2.8 seconds
Sample rotational speed: 10 to 12 Hz
Pulse width (90° pulse): 15 μs ($^{13}$C-NMR Measurement Condition)

Observation frequency: 150 MHz
Solvent: DMSO-d6
Polymer concentration: 10 mass %
Measurement temperature: 80° C.
Integration count: 8,000 times
Measurement mode: inverse gated decoupling method
Pulse delay time: 1.2 seconds
Sample rotational speed: 10 to 12 Hz
Pulse width (90° pulse): 16 μs Quantitative Determination of Boron Element Contained in Boron Compound (B)

A resin composition was pre-treated by a microwave decomposition device, and a boron element derived from a boron compound (B) contained in the resin composition was subjected to quantitative determination through ICP-MS measurement. 0.1 g of the resin composition was weighted in a quartz insert, and 6 mL of nitric acid (specific gravity: 1.42 g) was added. The quartz insert was placed in a decomposition container including 5 mL of water and 2 mL of hydrogen peroxide, and sealed. Microwave decomposition ("microwave decomposition device ETHOS-1" manufactured by Milestone General K.K., decomposition condition: a temperature was heated to 70° C. over three minutes, then cooled to 50° C. over two minutes, subsequently heated to 230° C. over 20 minutes, and maintained at 230° C. for 15 minutes) was carried out. After cooling, a filtrate obtained by filling the volume up to 50 mL followed by filtration through a filter having a pore diameter of 0.45 μm was subjected to ICP-MS measurement.

(ICP-MS Measurement Method)

Device name: "Agilent 7900" manufactured by Agilent Technologies, Inc.
RF output power: 1,500 W
Carrier gas flow rate: 0.7 L/min
Plasma mode: hot plasma
Measurement element in no gas mode: B, Na
Standard solution: "XSTC-622" manufactured by SPEX
Standard solution for calibration curve: 1.4 mol/L nitric acid solution for 0, 0.5, 5.0, 10.0, 30.0, and 50.0 ng/ml Measurement of Weight Average Molecular Weight and Molecular Weight Distribution A weight average molecular weight and molecular weight distribution were measured by gel permeation chromatography (GPC), and calculated as values in terms of the molecular weight of standard polymethyl methacrylate. A measurement condition is as follows.

(GPC Measurement Condition)

Device: "LC-20AT" manufactured by SHIMADZU CORPORATION
Detector: differential refractive index detector
Column: "TSKgel AWM-M" manufactured by Tosoh Corporation, two column were connected
Mobile phase: 10 mmol/L lithium bromide DMF solution
Sample concentration: 0.1 wt %
Flow rate: 0.5 mL/min
Column temperature: 40° C.

Method for Evaluating Coloration Resistance and Evaluation Criteria

A multilayer film produced for evaluation of interlayer adhesive properties described below was wound around a paper tube, and an end surface of a layer formed from a resin composition was visually observed. Coloration resistance was evaluated in accordance with the following evaluation criteria.

(Evaluation Criteria of Coloration Resistance)

A: coloration was not recognized
B: coloration was slightly recognized
C: the end surface was slightly yellowed
D: the end surface was yellowed
E: the end surface was strongly colored to develop orange Method for Evaluating Long Run Properties and Evaluation Criteria Long run properties were evaluated using MFR ("L260" manufactured by TATEYAMA KAGAKU CO., LTD.). A resin composition was kept in a melt indexer at a temperature of 210° C. and a load of 2,160 g for three minutes and discharged for one minute. At that time, the weight discharged was set to MRF3. A resin composition was kept for 15 minutes similarly and discharged for one minute. At that time, the weight discharged was set to MRF15. A ratio MFR15/MFR3 of MFR15 to MFR3 was calculated, and long run properties were evaluated in accordance with the following evaluation criteria. As the ratio MFR15/MFR3 was closer to 1, the resin composition had more favorable stability of melt viscosity and more excellent long run properties.

(Evaluation Criteria of Long Run Properties)

A: 0.8 or more and less than 1.2

B: 0.6 or more and less than 0.8, or 1.2 or more and less than 1.4

C: 0.4 or more and less than 0.6, or 1.4 or more and less than 1.6

D: 0.3 or more and less than 0.4, or 1.6 or more and less than 1.7

E: 0.2 or more and less than 0.3, or 1.7 or more and less than 1.8

F: less than 0.2 or 1.8 or more

Method for Evaluating Interlayer Adhesive Properties and Evaluation Criteria

Using a resin composition, a linear low-density polyethylene (LLDPE, "ULTZEX 2022L" manufactured by Mitsui Chemicals, Inc.), and an adhesive resin ("Bondine TX8030" manufactured by Sumitomo Chemical Co., Ltd., hereinafter also referred to as Ad), a three-component five-layer multilayer film (LLDPE/Ad/resin composition/Ad/LLDPE, thickness: 50 μm/10 μm/10 μm/10 μm/50 μm) was produced with a multilayer film extruder by the following production method under the following production condition. The produced multilayer film was cut in 150 mm in a MD direction and 15 mm in a TD direction immediately after production of the multilayer film, and the peel strength between the resin composition layer and the Ad layer was immediately measured with an autograph ("DCS-50M" manufactured by SHIMADZU CORPORATION) in a T-type peel mode. From the strength of the peel strength, interlayer adhesive properties were evaluated in accordance with the following evaluation criteria.

(Method for Producing Multilayer Film and Production Condition)

<Extruder>

For resin composition: 20-mmφ extruder ME-type CO-EXT for laboratory use manufactured by Toyo Seiki Seisaku Co., Ltd.

For Ad: 20-mmφ extruder SZW20GT-20MG-STD manufactured by TECHNOVEL CORPORATION

For LLDPE: 32-mmφ extruder GT-32-A manufactured by Research Laboratory of Plastics Technology Co., Ltd.

<Die>

300-mm-width coat hanger die manufactured by Research Laboratory of Plastics Technology Co., Ltd.

Resin composition extrusion temperature: supply unit/compression unit/measurement unit/die=175° C./210° C./210° C./210° C.

Ad extrusion temperature: supply unit/compression unit/measurement unit/die=100° C./160° C./220° C./220° C.

LLDPE extrusion temperature: supply unit/compression unit/measurement unit/die=150° C./200° C./210° C./220° C.

(Evaluation Criteria of Interlayer Adhesive Properties)

A: 300 g/15 mm or more

B: 200 g/15 mm or more and less than 300 g/15 mm

C: 100 g/15 mm or more and less than 200 g/15 mm

D: less than 100 g/15 mm

Method for Evaluating Gas Barrier Properties (Oxygen Permeability) and Evaluation Criteria The oxygen permeability of the multilayer film produced for evaluation of the interlayer adhesive properties described above was measured by a method described in JIS K 7126 (equal pressure method) under a condition of 20° C. and 100% RH using (oxygen permeability measurement device "MOCON OX-TRAN2/20 series") manufactured by MODERN CONTROLS INC., and gas barrier properties were evaluated in accordance with the following evaluation criteria.

(Evaluation Criteria of Gas Barrier Properties)

A: less than 10 mL·20 μm/($m^2$·day·atm)

B: 10 mL·20 μm/($m^2$·day·atm) or more and less than 20 mL·20 μm/($m^2$·day·atm)

C: 20 mL·20 μm/($m^2$·day·atm) or more and less than 40 mL·20 μm/($m^2$·day·atm)

D: 40 mL·20 μm/($m^2$·day·atm) or more and less than 60 mL·20 μm/($m^2$·day·atm)

E: 60 mL·20 μm/($m^2$·day·atm) or more

Melt Flow Rate (MFR)

5 g of dried pellet formed from a resin composition was put into a MELTFLOWRATE ("L260" manufactured by TATEYAMA KAGAKU CO., LTD.) and kept at a measurement temperature under a load of 2.16 kg for six minutes. Subsequently, the weight of resin discharged from the melt flow rate was collected and weighed three times at intervals of a certain time. An average value was determined, and MFR at a retention time of six minutes was calculated (unit: g/10 min).

Production Example 1

(1) Synthesis of Polymethyl Methacrylate

Into an autoclave equipped with a stirrer and a collecting tube, 100 parts by mass of methyl methacrylate, 0.0053 parts by mass of 2,2'-azobis(2-methylpropionitrile), and 0.20 parts by mass of n-octyl mercaptan were put in a nitrogen atmosphere and then stirred while nitrogen was blown. Thus, dissolved oxygen was removed to obtain a raw liquid. Next, the raw liquid was put into a tank reactor connected to the autoclave via a pipe to two thirds of the volume of the tank reactor, the temperature was maintained at 140° C., and a polymerization reaction was started in a batch mode. When a polymerization conversion ratio reached 48 mass %, the raw liquid was supplied from the autoclave to the tank reactor at such a flow rate that the average residence time was 150 minutes, a reaction liquid was extracted from the tank reactor at a flow rate corresponding to the supply flow rate of the raw liquid, the temperature was maintained at 140° C., and the polymerization reaction was switched to a continuous flow mode. The polymerization conversion ratio in a stationary state after the switching was 48 mass %. The reaction liquid extracted from the tank reactor in a stationary state was supplied to a multitubular heat exchanger at an internal temperature of 230° C. at such a flow rate that the average residence time was two minutes, and heated. Subsequently, the heated reaction liquid was introduced into an insulated flash evaporator, and a volatile matter that contained an unreacted monomer as a main component was removed to obtain a molten resin. The molten resin in which the volatile matter was removed was supplied to a twin-screw extruder at an internal temperature of 260° C., discharged in a strand shape, and cut with a pelletizer to obtain pellet-shaped polymethyl methacrylate. As a result of GPC analysis, the obtained polymethyl methacrylate had a weight average molecular weight of 117,000 g/mol, and a molecular weight distribution of 2.35.

Production Example 2

(2) Synthesis of Resin (A1)

250 parts of lithium aluminum hydride was put into a reactor equipped with a condenser, the reactor was purged with nitrogen, 3,000 parts of N-methylmorpholine was added, and the mixture was then heated to 130° C. and refluxed. To the mixture, a solution including 600 parts of the polymethyl methacrylate synthesized in Production Example 1 and 6,000 parts of N-methylmorpholine was added dropwise, and after completion of the dropwise addition, the mixture was refluxed for four hours. After that, 1,000 parts of ethyl acetate was added dropwise to deactivate an unreacted hydride, and 5,000 parts of a 50% phosphoric acid aqueous solution was further added dropwise. After cooling, the mixture was separated into a supernatant liquid and a solid content by centrifugation. The obtained supernatant liquid was added to distilled water to precipitate a polymer (first polymer). To the obtained solid content, 10,000 parts of ethanol was added, the mixture was heated at 60° C. for one hour for dissolution and then filtered through a glass filter. The obtained filtrate was condensed with an evaporator, and then added to distilled water to precipitate a polymer (second polymer). The polymers (the first polymer and the second polymer) obtained by precipitation were combined and added to distilled water at 100° C., and the mixture was sufficiently cleaned by boiling. After the cleaning, filtration was carried out to obtain a resin (A1).

Identification of Structure of Resin (A1)

$^{1}$H-NMR: δ=0.9 to 1.2 (3H, side chain methyl), 1.2 to 1.6 (2H, main chain methylene), 3.1 to 3.5 (2H, side chain methylene), 4.6 (1H, hydroxy group)

$^{13}$C-NMR: δ=21 to 27 (side chain primary carbon), 38 to 43 (main chain quaternary carbon), 43 to 52 (main chain secondary carbon), 67 to 73 (carbon bonded to a hydroxy group on a side chain).

Production Examples 3 to 8

(3) Synthesis of Resins (A2) to (A7)

Resins (A2) to (A7) were obtained in the same manner as in Production Example 2 except that a (co)polymer obtained by radical polymerization of each monomer listed in Table 1 was used in place of polymethyl methacrylate in Production Example 2.

| | Monomer | Monomer composition (ratio by mole) | Resin |
|---|---|---|---|
| Production Example 2 | Methyl methacrylate | 100 | Resin (A1) |
| Production Example 3 | Methyl methacrylate/ methyl acrylate | 85/15 | Resin (A2) |
| Production Example 4 | Methyl methacrylate/ methyl acrylate | 70/30 | Resin (A3) |
| Production Example 5 | Methyl methacrylate/ methyl acrylate | 30/70 | Resin (A4) |
| Production Example 6 | Methyl methacrylate/ styrene | 75/25 | Resin (A5) |
| Production Example 7 | Methyl methacrylate/ methyl acrylate | 25/75 | Resin (A6) |
| Production Example 8 | Methyl methacrylate/ styrene | 25/75 | Resin (A7) |

Production Example 9

(4) Synthesis of Resin (A8)

A resin (A8) was obtained in the same manner as in Production Example 2 except that polymethyl methacrylate was changed to "PARAPET (registered trademark) GF brand, methacrylic resin" manufactured by KURARAY CO., LTD in Production Example 2. The resin (A8) had 88 mol % of a structural unit represented by the formula (1) and an allyl alcohol-derived structural unit.

Example 1

450 g of water was added to 0.1 g of sodium borohydride and stirred to prepare a solution 1. 50 g of the solution 1 was weighted, and 3 g of the resin (A1) was added and immersed in the solution 1 at room temperature for five days with occasional stirring. After the immersing, a resin composition was collected and dried under reduced pressure at 80° C. for 12 hours. Thus, the resin composition was obtained.

The resin (A1) contained in the resin composition obtained in Example 1 had 99.9 mol % or more of the structural unit represented by the formula (1). The content of a boron element contained in the resin composition was 2 μmol per gram of the resin (A1). MFR15/MFR3 in the evaluation of long run properties was 0.92, the peel strength in the evaluation of interlayer adhesive properties was 530 g/15 mm, and the oxygen permeability in the evaluation of gas barrier properties was less than 0.01 mL/($m^2$·day·atm), which was detection limit. In the resin composition layer of the multilayer film produced in the evaluation of interlayer adhesive properties, fish eyes, streaks, gel, or particles were not recognized. Each evaluation result is shown in Table 2.

Example 2

A resin composition was obtained in the same manner as in Example 1 except that a solution 2 prepared by adding 1 g of ammonia water to 0.1 g of boric acid and adding 450 g of water was used in place of the solution 1. A resin contained in the resin composition obtained in Example 2 had 99.9 mol % or more of the structural unit represented by the formula (1). The content of a boron element contained in the resin composition was 2 μmol/g. Each evaluation result is shown in Table 2.

Example 3

A resin composition was obtained in the same manner as in Example 1 except that a solution 3 prepared by adding 10 g of ammonia water to 1 g of boric acid and adding 90 g of water was used in place of the solution 1. A resin contained in the resin composition obtained in Example 3 had 99.9 mol % or more of the structural unit represented by the formula (1). The content of a boron element contained in the resin composition was 30 μmol/g. Each evaluation result is shown in Table 2.

Example 4

A resin composition was obtained in the same manner as in Example 1 except that a solution 4 prepared by adding 25 g of ammonia water to 4 g of boric acid and adding 75 g of water was used in place of the solution 1. A resin contained in the resin composition obtained in Example 4 had 99.9 mol % or more of the structural unit represented by the formula (1). The content of a boron element contained in the resin composition was 161 μmol/g. Each evaluation result is shown in Table 2.

Examples 5 to 9

A resin composition was obtained in the same manner as in Example 1 except that the resin (A1) in Example 1 was changed to the resin (A2), the resin (A3), the resin (A4), the resin (A5), or the resin (A8) listed in Table 1. The content of the structural unit of the formula (1), the content of a boron element contained in the resin composition, and each evaluation result are shown in Table 2.

Comparative Examples 1 and 2

A resin composition was obtained in the same manner as in Example 1 except that the resin (A1) in Example 1 was changed to the resin (A6) or the resin (A7) listed in Table 1. The content of the structural unit of the formula (1), the content of a boron element contained in the resin composition, and each evaluation result are shown in Table 2.

Comparative Example 3

The resin (A1) was not treated with a boron compound (B), and each evaluation was carried out. The content of the structural unit of the formula (1), the content of a boron element contained in the resin composition, and each evaluation result are shown in Table 2.

Example 10

An autoclave made of SUS was charged with 200 g of THE, 8 g of sodium borohydride, and 5 g of the polymethyl methacrylate produced in Production Example 1 and purged with nitrogen, and the temperature was increased to 120° C. To the mixture, 80 g of methanol was added dropwise over one hour. When the internal pressure was increased by dropwise addition of methanol, the pressure was appropriately decreased. After completion of the dropwise addition, the reaction temperature was maintained at 120° C., and the reaction solution was stirred for one hour. The reaction solution was cooled and added to 2,000 g of distilled water to precipitate a product by reprecipitation. The product was collected by filtration, then again stirred in distilled water for two hours, and cleared. This mixture was filtered to obtain a resin composition. The resin composition had 90 mol % of the structural unit represented by the formula (1). The content of a boron element contained in the resin composition was 2 μmol/g. Each evaluation result is shown in Table 2.

Example 11

A resin composition was obtained in the same manner as in Example 10 except that the amount of sodium borohydride used was changed to 12 g in Example 10. The resin composition had 97 mol % of the structural unit represented by the formula (1). The content of a boron element contained in the resin composition was 6 μmol/g. Each evaluation result is shown in Table 2.

Example 12

A resin composition was obtained in the same manner as in Example 10 except that the amount of sodium borohydride used was changed to 15 g in Example 10. The resin composition had 99.9 mol % of the structural unit represented by the formula (1). The content of a boron element contained in the resin composition was 18 μmol/g. Each evaluation result is shown in Table 2.

Example 13

The same operation as in Example 12 was carried out until a polymer was precipitated by reprecipitation. The polymer was collected by filtration, then again stirred in distilled water for 30 minutes, cleaned, and filtered to obtain a resin composition. The resin composition had 99.9 mol % of the structural unit represented by the formula (1). The content of a boron element contained in the resin composition was 113 μmol/g. Each evaluation result is shown in Table 2.

Example 14

The resin (A1) obtained in Production Example 2 was dried in a vacuum dryer at 60° C. for five hours. Into a cylinder barrel of a twin-screw extruder, the dried resin (A1) was put at 10 kg/hr from a first raw material supply unit, and a resin temperature at an outlet was adjusted to 130° C. Into the molten resin (A1), an aqueous solution (solution 5) in which 0.1 kg of sodium borohydride was dissolved in 450 g of water was supplied at 0.83 L/hr from a second raw material supply unit near a distal end on the outlet side. A strand-shaped molten resin composition discharged from a die was cut with a strand cutter. The obtained resin composition was dried in a hot air dryer at 80° C, for three hours and then at 120° C. for 15 hours. The obtained resin composition had 99.9 mol % of the structural unit represented by the formula (1). The content of a boron element contained in the resin composition was 2 μmol/g. Each measurement result of the resin composition is shown in Table 2.

The twin-screw extruder and kneading condition used for the resin composition in Example 14 are as follows.

(Specification of Twin-Screw Extruder)

Caliber: 30 mmφ

L/D: 45.5

Screw: fully intermeshing, co-rotating

Screw rotational speed: 300 rpm

Die: 3 mmφ, five-hole strand die

Drawing rate: 5 m/min

Comparative Example 4

A resin composition was obtained in the same manner as in Example 14 except that ion exchanged water was supplied from the second raw material supply unit in place of the solution 5. The obtained resin composition had 99.9 mol % of the structural unit represented by the formula (1). The resin composition did not contain a boron element. Each measurement result is shown in Table 2.

| | Type of resin | Treatment method | Content (mol %) of structural unit of formula (1) | Content of boron element contained in resin composition (μmol/g) | Evaluation results: Coloration resistance | Long run properties | Interlayer adhesive properties | Gas barrier properties |
|---|---|---|---|---|---|---|---|---|
| Example 1 | Resin (A1) | Immersed in solution 1 | 99.9 | 2 | A | A | A | A |

-continued

| | Type of resin | Treatment method | Content (mol %) of structural unit of formula (1) | Content of boron element contained in resin composition (μmol/g) | Evaluation results Coloration resistance | Long run properties | Interlayer adhesive properties | Gas barrier properties |
|---|---|---|---|---|---|---|---|---|
| Example 2 | Resin (A1) | Immersed in solution 2 | 99.9 | 2 | A | A | A | A |
| Example 3 | Resin (A1) | Immersed in solution 3 | 99.9 | 30 | A | A | A | A |
| Example 4 | Resin (A1) | Immersed in solution 4 | 99.9 | 161 | A | A | A | A |
| Example 5 | Resin (A2) | Immersed in solution 1 | 85 | 2 | A | A | A | B |
| Example 6 | Resin (A3) | Immersed in solution 1 | 70 | 2 | A | A | A | C |
| Example 7 | Resin (A4) | Immersed in solution 1 | 30 | 2 | A | A | A | D |
| Example 8 | Resin (A5) | Immersed in solution 1 | 75 | 2 | A | A | A | C |
| Example 9 | Resin (A8) | Immersed in solution 1 | 88 | 2 | A | A | A | B |
| Example 10 | Production Example 1 | Reduced by $NaBH_4$ | 90 | 2 | A | A | A | A |
| Example 11 | Production Example 1 | Reduced by $NaBH_4$ | 97 | 6 | A | A | A | A |
| Example 12 | Production Example 1 | Reduced by $NaBH_4$ | 99.9 | 18 | A | A | A | A |
| Example 13 | Production Example 1 | Reduced by $NaBH_4$ | 99.9 | 113 | A | A | A | A |
| Example 14 | Resin (A1) | Treated with solution 5 | 99.9 | 2 | A | A | A | A |
| Comparative Example 1 | Resin (A6) | Immersed in solution 1 | 25 | 2 | A | A | A | E |
| Comparative Example 2 | Resin (A7) | Immersed in solution 1 | 25 | 2 | A | A | A | E |
| Comparative Example 3 | Resin (A1) | Not treated | 99.9 | — | E | F | D | A |
| Comparative Example 4 | Resin (A1) | Treated with ion exchanged water | 99.9 | — | E | F | D | A |

Subsequently, the melt flow rate (MFR) of the resin composition of the present invention was measured.

Example 15

An autoclave made of SUS was charged with 200 g of THE, 15 g of sodium borohydride, and 5 g of the polymethyl methacrylate produced in Production Example 1 and purged with nitrogen, and the temperature was increased to 120° C. To the mixture, 80 g of methanol was added dropwise over one hour. When the internal pressure was increased by dropwise addition of methanol, the pressure was appropriately decreased. After completion of the dropwise addition, the reaction temperature was maintained at 120° C., and the reaction solution was stirred for one hour. The reaction solution was cooled and added to 2,000 g of distilled water to precipitate a product by reprecipitation. The product was collected by filtration. As a cleaning process, an operation of stirring the product in 2,000 g of distilled water for two hours followed by filtration was repeated three times to obtain a resin composition. The resin composition had 99.9 mol % of the structural unit represented by the formula (1). The content of a boron element contained in the resin composition was 0.1 μmol/g. MFR (a load of 2.16 kg and 230° C.) of the obtained resin composition was measured. The results are shown in Table 3.

Example 16

The operation was the same as in Example 15 except that the amount of cleaning water was changed to 1,900 g in the cleaning process. The results are shown in Table 3.

Example 17

The operation was the same as in Example 15 except that the amount of cleaning water was changed to 1,800 g in the cleaning process. The results are shown in Table 3.

Example 18

The operation was the same as in Example 15 except that the amount of cleaning water was changed to 1,700 g in the cleaning process. The results are shown in Table 3.

Example 19

The operation was the same as in Example 15 except that the amount of cleaning water was changed to 1,600 g in the cleaning process. The results are shown in Table 3.

Example 20

The operation was the same as in Example 15 except that the amount of cleaning water was changed to 1,500 g in the cleaning process. The results are shown in Table 3.

Example 21

The operation was the same as in Example 15 except that the amount of cleaning water was changed to 1,000 g in the cleaning process. The results are shown in Table 3.

Reference Example 1

MFR (a load of 2.16 kg and 230° C.) of the resin (A1) obtained in Production Example 2 was measured. The obtained value of MFR was named $MFR_0$. The results are shown in Table 3.

| | Resin (A) | Content (B) (μmol/g) of boron element contained in resin composition | Content (OH) (mol/g) of hydroxy group contained in resin (A) | (B)/(OH), $\times 10^{-6}$ | MFR (g/10 min) | MFR ratio ($MFR/MFR_0$) |
|---|---|---|---|---|---|---|
| Example 15 | Resin | 0.1 | 1,070 | 0.0001 | 11 | 1.0 |
| Example 16 | (A1) | 1.4 | 1,071 | 0.0013 | 11 | 1.0 |
| Example 17 | | 3.3 | 1,071 | 0.0031 | 11 | 1.0 |
| Example 18 | | 4.9 | 1,071 | 0.0046 | 7.7 | 0.7 |
| Example 19 | | 14 | 1,071 | 0.0128 | 6.9 | 0.6 |
| Example 20 | | 28 | 1,071 | 0.0262 | 5.9 | 0.5 |
| Example 21 | | 52 | 1,071 | 0.0485 | 3.3 | 0.3 |
| Reference Example 1 | | 0 | 1,071 | — | 11 | — |

In Examples 15 to 21 and Reference Example 1: MFR was measured at a load of 2.16 kg and 230° C.

In general, when a boron compound is added to a polymer having a hydroxy group, the hydroxy group is coordinated to a boron atom, and therefore the motility of the polymer is decreased. That is, the flowability of a resin composition is decreased. However, surprisingly, a decrease in flowability of the resin composition of the present invention is relatively reduced even when the amount of the boron compound is increased. For example, even when as described in Example 21, the content of the boron element was relatively high, MFR was 3 or more. Therefore, melt processing is possible. Although details about this are not clear, it is considered that while a hydroxy moiety of a hydroxymethylene group on a side chain of the polymer is relatively highly coordinated to boron, decoordination is likely to occur due to high degree of freedom of rotation around carbon of a methylene moiety, and as a result, coordination/decoordination is likely to occur, and this behavior may contribute to excellent flowability of the resin composition.

Hereinafter, examples of the molded body using the resin composition of the present invention will be described.

Example 22

Production of Single Layer Film

The resin composition obtained in Example 1 was melt extruded at 220° C. with Labo Plastomill manufactured by Toyo Seiki Seisaku-sho, Ltd., provided with a twin-screw extruder having a screw diameter of 20 mm, to form pellets. A film of a single layer was formed from the obtained pellets at a die temperature of 220° C. with Labo Plastomill manufactured by Toyo Seiki Seisaku-sho, Ltd., provided with a single-screw extruder having a screw diameter of 20 mm and a coat hanger die having a width of 300 mm and a lip gap of 0.3 mm, to obtain a single-layer film having a thickness of 15 μm. The obtained single-layer film was colorless and transparent and had favorable appearance.

Example 23

Production of Laminated Film

On both surfaces of the single-layer film obtained in Example 22, a low-density polyethylene (LDPE) film having a corona-treated surface to be adhered and having a thickness of 50 μm was laminated through a urethane adhesive, to obtain a laminated film having a configuration of 50-μm LDPE/15-μm resin composition/50-μm LDPE. From the obtained laminated film, two 10-cm square films were cut out, 20 g of ketchup was disposed between the films, the films were sealed by heat sealing in a nitrogen box, and a storage test was carried out at 40° C. and a relative humidity of 50% for 180 days. As a result, discoloration of ketchup was not recognized.

Example 24

Application of Resin Composition to Adhesive

A laminated film having a configuration of LDPE/EF-F/LDPE was obtained in the same manner as in Example 23 except that a film formed from "EF-F" manufactured by KURARAY CO., LTD., and having a thickness of 15 μm was used in place of the intermediate layer formed from the resin composition and an adhesive in which the resin composition was added to the urethane adhesive used in Example 23 such that the content of the resin composition was 10 mass % of the whole adhesive was used as the urethane adhesive. The evaluation was carried out in the same manner as in Example 23, and discoloration of ketchup was not recognized.

Example 25

Production of Pouch

A urethane-isocyanate adhesive ("TAKELAC A-385"/"TAKENATE A-10" manufactured by Takeda Pharmaceutical Company Limited) was applied in a weight of a solid content of 2.5 $g/m^2$ to a surface of a biaxially oriented polypropylene film (OPP, "Tohcello OP U-1" manufactured by Tohcello Co., Ltd., melting point: 155° C., thickness: 20 μm), and the single-layer film obtained in Example 22 was then laminated on the coated surface by a dry lamination method. Subsequently, a linear low-density polyethylene film (LLDPE, "Tohcello TUX-TC" manufactured by Tohcello Co., Ltd., density: 0.92 $g/cm^3$, thickness: 65 μm) was laminated on a surface of the single-layer film by the same dry lamination method to produce a multilayer structure (laminated film having a total thickness of 100 μm) having a configuration of OPP/resin composition/LLDPE. Next, the laminated film was sealed such that the surface of LLDPE became a seal surface, to produce a pouch, and the following items (1) and (2) were evaluated.

(1) Bag Production Processability

A three side-sealed bag (pouch, 150 mm×230 mm, seal width: 15 mm) was produced at seal bar temperature of 180° C. and a bag production speed of 85 bags/min with a high-speed automatic pouch making machine "HSE-500A" manufactured by NISHIBE KIKAI CO., LTD. The produced pouch was favorable in the appearance of a sealed surface (the presence or absence of appearance defects such as a dart, a pinhole, waving, whitening, and seal shifting) and seal strength.

(2) Appearance

The appearance of the three side-sealed bag (pouch) was visually checked and comprehensively determined in terms of the presence or absence of appearance defects such as gel, fish eyes, streaks, wood-grain patterns, and coloration, and transparency (whitening feeling). The three side-sealed bag was favorable.

Example 26

Production of Hollow Molded Container

A three-component five-layer hollow molded container (volume: 350 mL) having a total thickness of 700 μm was molded with a direct blow multilayer hollow molding machine TB-ST-6P manufactured by Yugen Kaisha Suzuki Tekkosho by a direct blow molding method using the resin composition obtained in Example 1 for an intermediate layer, a polypropylene (PP, "B200" manufactured by Mitsui Chemicals, Inc.) for inner and outer layers, and maleic anhydride-modified polypropylene (M-PP, "ADMER QB550" manufactured by Mitsui Chemicals, Inc.) for an adhesion layer such that a configuration of thickness of a container body was PP (320 μm, outer layer)/M-PP (10 μm)/resin composition/M-PP (10 μm)/PP (350 μm, inner layer). The moldability and appearance of the molded body were very favorable. A die temperature during the molding was set to 220° C., and a blow mold temperature was set to 25° C.

Example 27

Production of Vacuum Insulator

A vacuum insulator was produced using the multilayer structure that was obtained in Example 25 and had a configuration of OPP/resin composition/LLDPE. Specifically, the multilayer structure was first cut into two multilayer structures having a predetermined shape. Subsequently, the two multilayer structures were overlapped such that the OPP layers were disposed inside, and heat-sealed at three sides of the rectangle to form a bag. Next, the bag was filled with an insulative core material from an opening of the bag and sealed at a temperature of 20° C. and an internal pressure of 10 Pa with a vacuum packaging machine (VAC-STAR 2500 manufactured by Frimark GmbH). Thus, the vacuum insulator was successfully produced. As the insulative core material, silica fine powder dried at 120° C. for four hours was used.

Example 28

Production of Coating Film

A coating film was produced using the resin composition obtained in Example 1. Specifically, 0.5 g of the resin composition obtained in Example 1 was dissolved in 9.5 g of 1-propanol to prepare a coating liquid. Subsequently, the coating liquid was applied with a bar coater to a corona-treated surface of "P60" of "Lumirror" (registered trademark) manufactured by Toray Industries, Inc., which was a biaxially oriented polyethylene terephthalate film having a surface corona-treated and having a thickness of 12 μm such that the dried thickness was 1.0 μm. The film after applying was dried at 100° C. for five minutes and then at 140° C. for 10 minutes to form a layer of the resin composition on a polyethylene terephthalate film. Thus, the coating film (multilayer structure) having favorable appearance and having a configuration of polyethylene terephthalate/the resin composition was obtained.

Example 29

Production of Solar Cell Module

A solar cell module was produced using the multilayer structure obtained in Example 28. Specifically, a cell of an amorphous silicon solar cell provided on a 10-cm square tempered glass was held in an ethylene-vinyl acetate copolymer film having a thickness of 450 μm. Next, the multilayer structure was bonded to the film with the polyethylene terephthalate layer of the multilayer structure facing outward, to produce the solar cell module. The bonding was carried out by vacuuming at 150° C. for three minutes and then crimping for nine minutes. The produced solar cell module favorably operated and exhibited favorable electric output characteristics over an extended period of time.

Example 30

Application of Resin Composition to Powder Coating

The resin composition obtained in Example 1 was pulverized with a low-temperature pulverizer (using liquid nitrogen) to obtain a powder that had been passed through a wire mesh with a mesh size of 20 and remained on a wire mesh with a mesh size of 100. The obtained powder was put into a thermal spraying facility, sprayed onto a steel plate of 150 mm×250 mm×2 mm degreased and washed with a solvent, and cooled in the air. Thus, a steel plate having a resin composition layer having an average thickness of 55 μm and a steel plate having a resin composition layer having an average thickness of 400 μm were obtained. The resin composition layers in both the steel plates had favorable glossiness and smoothness.

Example 31

Production of Liquid-Packaging Paper Container

Both surfaces of paper (a paper board) that was a substrate were subjected to a flame treatment, and a low-density polyethylene (LDPE) having a thickness of 50 μm was laminated on both the surfaces of the paper by an extrusion coating method to produce a three-layer structure having a configuration of LDPE/paper/LDPE. A low-density polyethylene layer that was a surface of the three-layer structure was corona-treated, and the resin composition obtained in Example 1 was laminated on the corona-treated surface by an extrusion coating method such that the thickness was 15 μm, to produce a multilayer structure having a configuration of four layers. From the multilayer structure having a configuration of four layers, a gable-top paper container having a length of 7 cm, a width of 7 cm, and a height of 19 cm was produced such that the resin composition layer was an inner layer. The paper container was filled with orange juice, purged with nitrogen, and then sealed at an upper portion by heat sealing. A sensory test of alteration in taste after 10-week storage in an environment at 20° C. and 100% RH was carried out. As a result, the quality of the content hardly changed before the storage.

Example 32

Production of Thermoformed Container

A sheet for thermoforming of a three-component five-layer (PP/Ad/resin composition/Ad/PP=400 μm/20 μm/20 μm/20 μm/400 μm in thickness) having a total thickness of 860 μm was obtained with a co-extruder equipped with a T die using the resin composition obtained in Example 1 for an intermediate layer, homopolypropylene (PP, “J103” manufactured by Grand Polymer Co., Ltd., MI=3.0 g/10 min (230° C. and a loading of 2160 g), Vicat softening point: 155° C.) for inner and outer layers, and maleic anhydride-modified polypropylene (“ADMER QF500” manufactured by Mitsui Chemicals, Inc., MI=5.3 g/10 min (230° C. and a loading of 2160 g)) for an adhesive (Ad) layer. The obtained sheet was thermoformed (using compressed air: 5 kg/$cm^2$, plug: 45 mmφ×65 mm, syntax form, plug temperature: 150° C., die temperature: 70° C.) at a sheet temperature of 150° C. into a cup shape (die shape: 70 mmφ×70 mm, draw ratio S=1.0) with a thermoforming machine (manufactured by Asano Seisakusho). A thermoformed container having favorable appearance was obtained.

Example 33

Production of Blister Pack

A three-component five-layer multilayer structure (PP/Ad/resin composition/Ad/PP=130 μm/10 μm/10 μm/10 μm/130 μm in thickness, the total thickness was 290 μm) was obtained by melt film formation with a feedblock type multilayer film extrusion molding machine including three extruders using the resin composition obtained in Example 1 for an intermediate layer, polypropylene (PP, “NOVATEC EAZAD” manufactured by Japan Polypropylene Corporation) for inner and outer layers, and maleic anhydride-modified polypropylene (“ADMER QF500” manufactured by Mitsui Chemicals, Inc.) for an adhesive (Ad) layer. A blister pack was produced using the obtained multilayer structure. The molded blister pack had favorable appearance. The oxygen permeability was less than 0.01 mL/($m^2$·day·atm). The production condition of the multilayer structure, the extrusion condition of each resin, and the production condition of the blister pack are each as follows.

(Production Condition of Multilayer Structure)

- Device: feedblock type multilayer film extrusion molding machine
- Die: 300-mm-width coat hanger die manufactured by Research Laboratory of Plastics Technology Co., Ltd.
- Die temperature: 210° C.
- Temperature of cooling roll: 80° C.
- Drawing rate: 1.5 m/min (Extrusion Condition of Resin Composition)

- Device: ME-type CO-EXT for laboratory use manufactured by Toyo Seiki Seisaku Co., Ltd. (20-mmφ single-screw extruder)
- Screw rotational speed: 7 rpm
- Extrusion temperature: supply unit/compression unit/measurement unit=170° C./210° C./210° C.

(Extrusion Condition of Polypropylene)

- Device: GT-32-A manufactured by Research Laboratory of Plastics Technology Co., Ltd. (32-mmφ single-screw extruder)
- Screw rotational speed: 70 rpm
- Extrusion temperature: supply unit/compression unit/measurement unit=170° C./210° C./210° C.

(Extrusion Condition of Adhesive Resin)

- Device: SZW20GT-20MG-STD manufactured by Technovel Corporation (20-mmφ single-screw extruder)
- Screw rotational speed: 12 rpm
- Extrusion temperature: supply unit/compression unit/measurement unit=170° C./210° C./210° C.

(Production Condition of Blister Pack)

- Device: Ez Blister manufactured by Sepha Limited
- Cavity size: 22 mm in length, 8 mm in width, 8 mm in height
- Stretching ratio: 0.36 in length, 1.0 in width
- Temperature: 168° C.
- During preheating: 0.075 MPa/4 s
- During thermoforming: 0.10 MPa/4 s Example 34

Production of Shrink Film

The resin composition obtained in Example 1 was melt extruded at 210° C. with Labo Plastomill manufactured by Toyo Seiki Seisaku-sho, Ltd., provided with a twin-screw extruder having a screw diameter of 20 mm, to form pellets. From the obtained pellets, a multilayer sheet (ionomer resin layer/adhesive resin layer/resin composition layer/adhesive resin layer/ionomer resin layer) was produced with a three-component five-layer co-extruder. As the thickness of each layer constituting the sheet, the thickness of each of both the outermost layers of an ionomer resin (“HIMILAN 1652” manufactured by DuPont-Mitsui Polychemicals Co., Ltd.) was 250 μm, the thickness of each of the adhesive resin layers (“ADMER NF518” manufactured by Mitsui Chemicals, Inc.) was 30 μm, and the thickness of the resin composition layer was 90 μm. The obtained sheet was subjected to simultaneous biaxial stretching at 90° C. and a stretch ratio of 4× 4 times with a pantagraph type biaxial stretching machine to obtain a shrink film in which a configuration of thickness of the layers was 15 μm/2 μm/6 μm/2 μm/15 μm and the total thickness was 40 μm. The obtained multilayer shrink film had no unevenness or uneven thickness, and was relatively favorable in appearance and transparency. The multilayer shrink film was folded in two and heat-sealed at two sides (both sides) to produce a bag. The bag was charged with processed meat and then heat-sealed at an opening in vacuum. Subsequently, the vacuum packaging bag was immersed in hot water at 85° C. for 5 seconds to thermally shrink the film. As a result, the film closely attached to the processed meat was not wrinkled, abnormal deformation of the content was small, and the content was relatively favorable.

Example 35

Production of Pipe

A pipe having an outer diameter of 20 mm was produced with a four-component five-layer co-extrusion multilayer pipe molding machine using the resin composition obtained in Example 1. The configuration of the pipe was an outermost layer formed from polyamide 12 (UBE Nylon 30200 manufactured by Ube Industries, Ltd.) having a thickness of 450 μm/an adhesive resin layer (ADMER VF500 manufactured by Mitsui Chemicals, Inc.) having a thickness of 50 μm/a polyamide 6 layer (AMILAN CM1046 manufactured by Toray Industries, Inc.) having a thickness of 100 μm/a resin composition layer having a thickness of 150 μm/an innermost layer formed from polyamide 6 (AMILAN CM1046 manufactured by Toray Industries, Inc.) and having a thickness of 250 μm.

Next, water in which dissolved oxygen was removed with a packing tower filled with metal tin was circulated in the pipe produced above, and an increase rate in concentration of oxygen dissolved in the water was measured at a temperature of 70° C. The increase rate μg/(L·hr) described herein refers to an increase rate μg/hr of dissolved oxygen per litter of water in the pipe. That is, when the volume of water in all systems of a device including the pipe is represented by V mL, the volume of water in the pipe is represented by V' mL, and the increase rate of concentration of dissolved oxygen in water circulated in the device per unit time is represented by B μg/(L·hr), the increase rate of dissolved oxygen A μg/(L·hr) indicates a value calculated by $A=B\cdot(V/V')$. The increase rate in concentration of dissolved oxygen in the pipe was measured at a relative humidity of 80% in an external atmosphere. The increase rate of dissolved oxygen was 1 μg/(L·hr), and a favorable result was obtained.

Example 36

Production of Fuel Tank (Blow Molded Container)

A blow molded container was produced using the resin composition obtained in Example 1 and a collected resin prepared from the resin composition as described below.

(1) Preparation of Collected Resin 4 parts by mass of the resin composition obtained in Example 1, 86 parts by mass of high-density polyethylene ("HZ8200B" manufactured by Mitsui Chemicals, Inc., melt flow rate (MFR) at 190° C. and a load of 2, 160 g=0.01 g/10 min), and 10 parts by mass of adhesive resin ("ADMER GT-6A" manufactured by Mitsui Chemicals, Inc., melt flow rate (MFR) at 190° C. and a load of 2,160 g=0.94 g/10 min) were dry blended. Subsequently, the blend was extruded in a nitrogen atmosphere with a twin-screw extruder ("2D25W" manufactured by Toyo Seiki Seisaku-sho, Ltd., 25 mmφ, die temperature: 220° C., screw rotational speed: 100 rpm) into pellets. In order to obtain a model collected resin, the extruded pellets were further extruded with the extruder under the same condition into pellets. This operation was carried out four times in total (blending with the extruder was carried out five times in total) to obtain the model collected resin.

(2) Production of Fuel Tank (Blow Molded Container)

The blow molded container having a four-component six-layer configuration of (inside) high-density polyethylene/adhesive resin/resin composition/adhesive resin/collected resin/resin composition (outside) was produced at 210° C. with a blow molding machine "TB-ST-6P" manufactured by Suzuki Tekkosho using the dried pellets of the resin composition, the high-density polyethylene, the adhesive resin, and the collected resin. In the production of the blow molded container, a 3-L tank having a total layer average thickness of 1,000 μm ((inside) high-density polyethylene/adhesive resin/resin composition/adhesive resin/collected resin/resin composition (outside)=(inside) 340 μm/50 μm/40 μm/50 μm/400 μm/120 μm (outside)) was molded by cooling at a mold inner temperature of 15° C. for 20 seconds. The bottom diameter of the tank was 100 mm, and the height thereof was 400 mm. The appearance of the obtained blow molded container was evaluated. The container had less streaks or the like, and was favorable.

Example 37

Production of Single-Layer Film Having Nylon Blended Therein, and Laminated Film and Pouch Using Single-Layer Film 80 parts by mass of the resin composition obtained in Example 1 and 20 parts by mass of polyamide ("Ny1018A" (Nylon 6) manufactured by Ube Industries, Ltd.) were dry blended and extruded in a nitrogen atmosphere with a twin-screw extruder (2D25W manufactured by Toyo Seiki Seisaku-sho, Ltd., 25 mmφ) under an extrusion condition of a die temperature of 250° C. and a screw rotational speed of 100 rpm into pellets. Subsequently, a single-layer film having a thickness of 20 μm was produced from the extruded pellets with a single-screw extruder (D2020 manufactured by Toyo Seiki Seisaku-sho, Ltd., D (mm)=20, L/D=20, compression ratio=2.0, screw: full flight). The extrusion condition is as follows.

(Extrusion Condition)

Extrusion temperature: 250° C.
Screw rotational speed: 40 rpm
Die width: 30 cm
Temperature of drawing roll: 80° C.
Rate of drawing roll: 3.1 m/min The obtained single-layer film, a commercially available biaxially stretched nylon 6 film ("EMBLEM ON" manufactured by UNITIKA LTD., average thickness: 15 μm), and a commercially available unstretched polypropylene film ("Tohcello CP" manufactured by Tohcello Co., Ltd., average thickness: 60 μm) were each cut into A4 size. An adhesive for dry lamination was applied to both surfaces of the single-layer film, dry lamination was carried out such that the nylon 6 film became an outer layer and the unstretched polypropylene film became an inner layer, and the laminate was dried at 80° C. for three minutes to obtain a transparent laminated film including three layers. As the adhesive for dry lamination, an adhesive including "TAKELAC A-385" manufactured by Mitsui Chemicals, Inc., as a major agent, "TAKENATE A-50" manufactured by Mitsui Chemicals, Inc., as a curing agent, and ethyl acetate as a diluted solution was used. The amount of the adhesive applied was 4.0 g/m. After the lamination, the laminated film was cured at 40° C. for three days.

From the obtained laminated film, a pouch that was sealed at four sides of a square having an inside dimension of 12 cm×12 cm was produced. A content was water. The pouch was subjected to a retort treatment at 120° C. for 20 minutes with a retorting machine (high-temperature and high-pressure cooking sterilization tester "RCS-40RTGN" manufactured by Hisaka Works, Ltd.). After the retort treatment, water on the surface of the pouch was wiped off, and the pouch was left in a high temperature and high humidity chamber at 20° C. and 65% RH for one day. The appearance characteristics of the pouch were then evaluated as evaluation of retort resistance. The appearance characteristics did not large change and was determined to be favorable.

The invention claimed is:

1. A resin composition comprising:

a resin (A) comprising at least 30 mol % of a structural unit represented by the following formula (1), and a boron compound (B), wherein the boron compound (B) comprises from 0.01 μmol to 2,000 μmol of a boron element per gram of the resin (A)

(1)

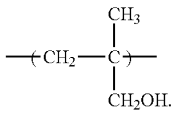

2. A molded body comprising the resin composition of claim 1.

3. The molded body according to claim 2, further comprising a multilayer structure comprising a layer comprising the resin composition and at least one other layer.

4. The molded body according to claim 2, further comprising a multilayer structure comprising a layer comprising the resin composition and a thermoplastic resin layer laminated on one surface or both surfaces of the layer.

5. The molded body according to claim 2, wherein a layer comprising the resin composition has a thickness of from 0.01 μm to 1,000 μm.

6. A film comprising the molded body of claim 2.

7. A packaging material comprising the film of claim 6.

8. A method for producing a resin composition, the method comprising:

bringing a resin (A) comprising at least 30 mol % of a structural unit represented by the following formula (1), a boron compound (B) and water into contact with each other (1)

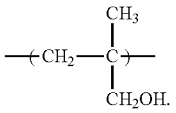

9. The method for producing a resin composition according to claim 8, wherein the boron compound (B) is sodium borohydride or borax.

10. The method for producing a resin composition according to claim 8, wherein the resin (A) is in a molten state.

11. The method for producing a resin composition according to claim 8, comprising immersing the resin (A) in an aqueous solution comprising the boron compound (B).

12. The resin composition according to claim 1, wherein the content of the structural unit represented by the formula (1) contained in the resin (A) is at least 45 mol %.

13. The method for producing a resin composition according to claim 8, wherein the content of the structural unit represented by the formula (1) contained in the resin (A) to be brought into contact with the boron compound (B) and water is at least 45 mol %.

* * * * *